April 25, 1933.  C. B. NORRIS ET AL  1,905,048
METHOD OF MAKING WOOD MOLD DIES
Filed April 23, 1930  3 Sheets-Sheet 1

April 25, 1933.                C. B. NORRIS ET AL                1,905,048
                       METHOD OF MAKING WOOD MOLD DIES
                    Filed April 23, 1930        3 Sheets-Sheet 2
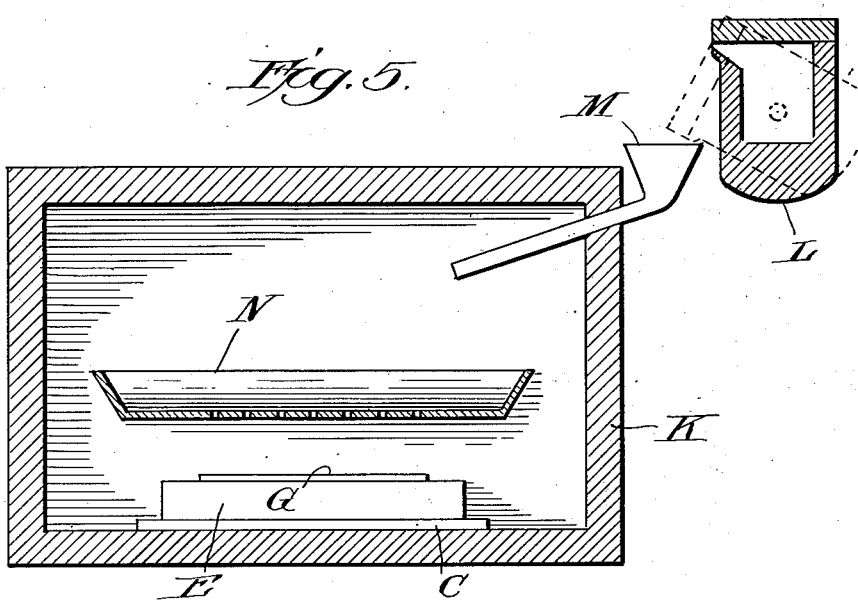
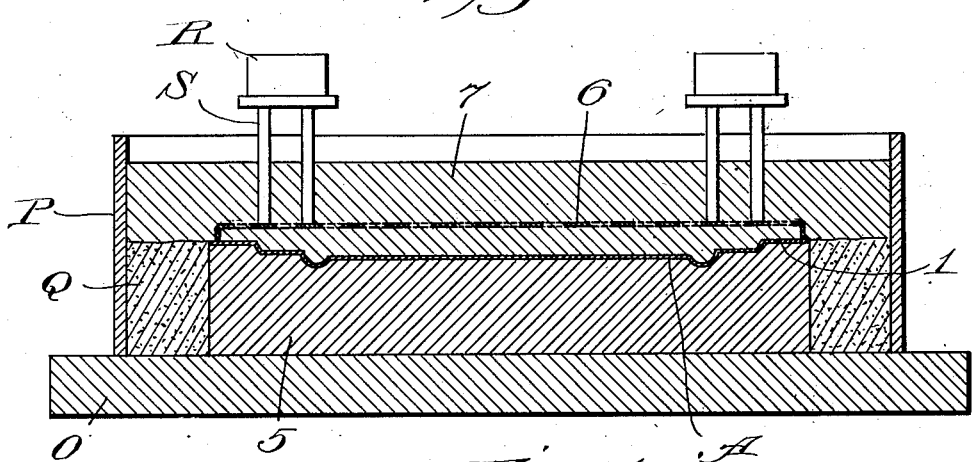
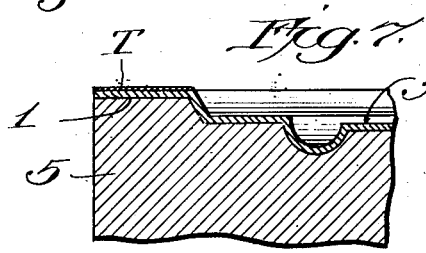

Patented Apr. 25, 1933

1,905,048

UNITED STATES PATENT OFFICE

CHARLES B. NORRIS, FRANK M. CURRAN, AND HENDRIK W. VAN STEENWYK, OF GRAND RAPIDS, MICHIGAN, ASSIGNORS TO HASKELITE MANUFACTURING CORPORATION, A CORPORATION OF NEW YORK

METHOD OF MAKING WOOD MOLD DIES

Application filed April 23, 1930. Serial No. 446,656.

The present invention relates to dies for molding plywood panels and has for its object to improve such dies and their method or manufacture.

Figure 1:
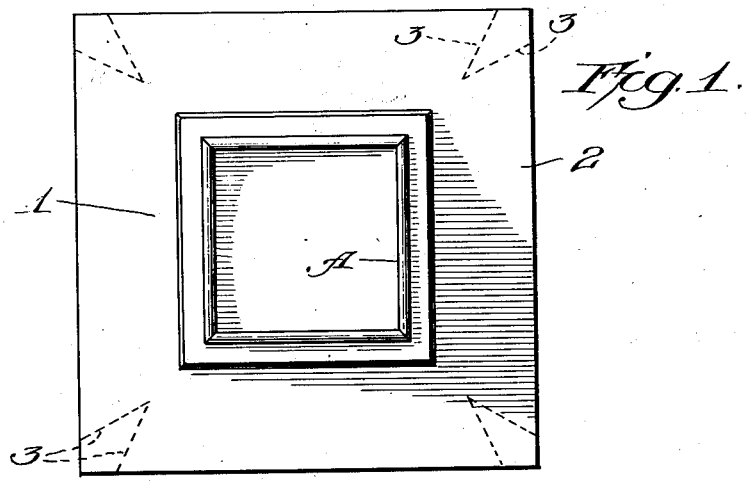
Figure 2:
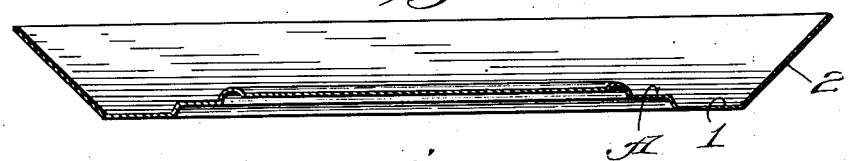
Figure 3:
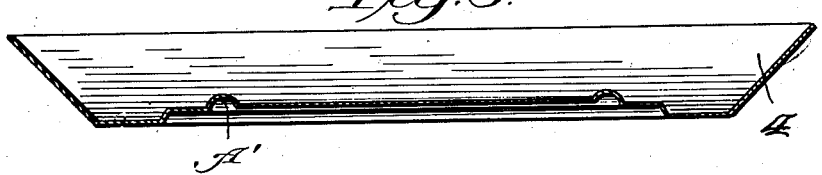
Figure 4:
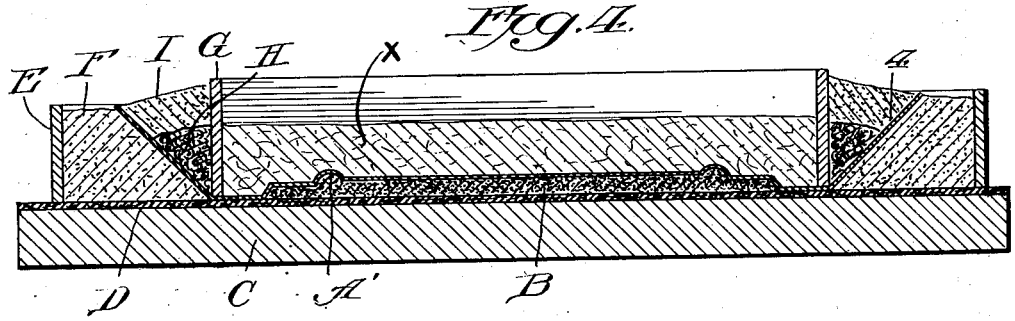
Figure 8:
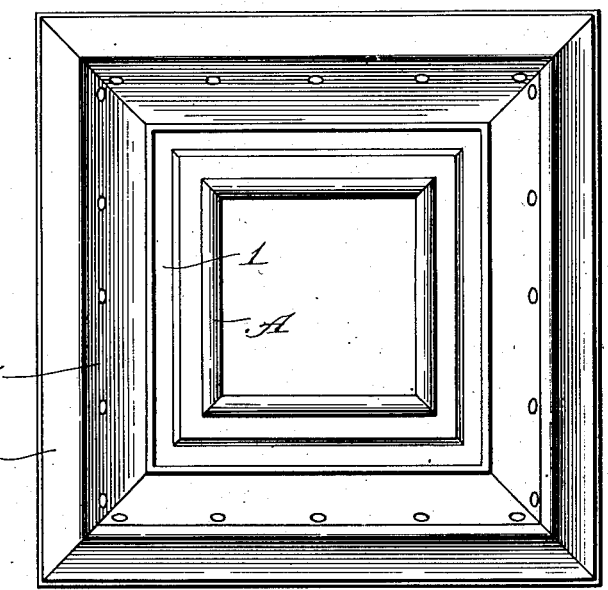
Figure 9:
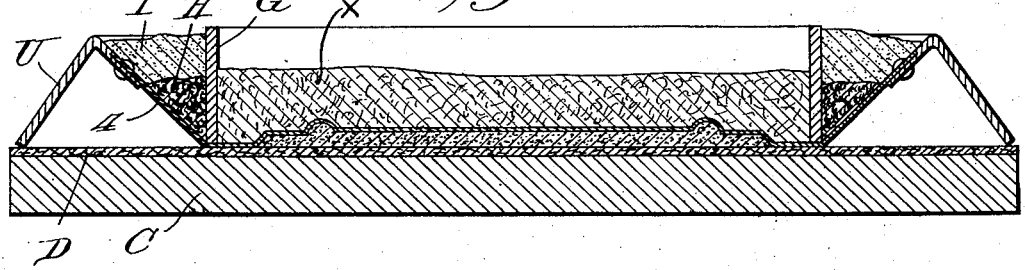
Figure 10:
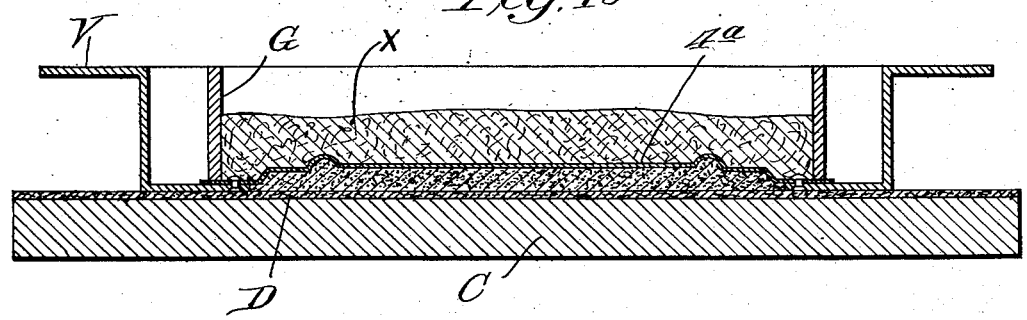

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a plan view of the electrodeposited shell or plate conforming to the original carving, the dotted lines in the corners marking the gores that are afterwards cut away; Fig. 2 is a vertical section through the shell or plate after it has been formed into a pan; Fig. 3 is a view similar to Fig. 2 showing a shell to form the working face of a die member, or a master pattern for such a shell; Fig. 4 is a section through a mold apparatus having a shell like that in Fig. 3 therein; Fig. 5 is a diagrammatic view illustrating the devices of Fig. 4 in a heating oven and a pouring means for delivering molten metal thereto; Fig. 6 is a cross-section through a completed die, after pouring and finishing, together with a second mold apparatus and a complementary die member cast upon the first die member; Fig. 7 is a section, on a larger scale, through a fragment of the first die, illustrating an expedient to avoid close fitting of the two dies at any desired points; Fig. 8 is a top plan view of the shell provided with an attachment to help form a somewhat different form of mold; Fig. 9 is a vertical section, on a larger scale than Fig. 8, showing the shell in an assembly ready for pouring; and Fig. 10 is a view similar to Fig. 9, showing a still further modification.

In the art to which the present invention relates a carving in wood is usually made; a wax impression is taken of the carving; and a plate or shell is electro-deposited upon the wax impression. In accordance with our invention this plate or shell is made considerably larger than the design; the part bearing the design A and corresponding in size to the face of the die to be made, indicated at 1 in Fig. 1, being completely surrounded by a border portion 2. Gores defined by the dotted lines 3, 3 in Fig. 1 are then cut out of the corners of the border portion and the remaining sections of the border portion are bent up and soldered together at their meeting edges; thereby producing a pan having the design in the upper face of the bottom wall and having sides composed of the marginal sections 2. In other words, the inside of the pan is smooth, whereas the outside is the rough face of the electroplate.

The inside of the pan is then covered with a very thin layer of wax over which graphite is dusted, and a copper shell 4 is electrodeposited on the inner face of the pan, so treated. This copper shell has the design $A^1$ on the under side of the bottom, the upper face of the bottom of the shell being the rough one. This shell may be used as a master when backed with electrotype metal, or as part of an actual die. When the shell is used as a master, wax impressions are made and dusted with graphite, and copper is deposited thereon to a thickness of about one-sixteenth of an inch to produce shells for use as parts of dies; these new shells being identical with the shell 4, so that the further steps in our process may be described with reference to shell 4.

The die cavities in the shell are filled with lava patch, as indicated at B in Fig. 4, and the shell is set upon a cast iron plate C, preferably about one-half inch thick and covered on the upper side by a sheet D of asbestos about one-eighth of an inch thick. A low iron frame E, open at the top and at the bottom and both longer and wider than the shell, is placed so as to rest on the asbestos and surround the shell. The space between the sides of the pan and the frame is filled with dry molding sand F. A second iron frame G, similar to the first frame but smaller, is set in the pan so as to rest on the bottom of the latter close to the sides. The space between this second frame and the sides of the pan is partially filled with ground asbestos, H, and that part of the space that is above the asbestos is filled with dry molding sand I. A flux X, conveniently dehydrated borax, is poured into the pan within the space bounded by the inner frame, and the assembly is ready for the casting step.

The assembly just described, consisting of what may be termed the mold containing the copper shell partially filled with a flux, is then put into a furnace K, as shown in Fig. 5, and is heated to a temperature of about 1600 degrees F. Brass, preferably almost entirely of the bata type, is melted in a separate furnace and is also brought to a temperature of about 1600 degrees F. The apparatus is so arranged that the molten brass may be poured into the mold without removing the latter from its furnace. For example, the brass may be in a pot L from which it may be poured, by tilting the pot as indicated in dotted lines in Fig. 5, into a funnel M whose spout extends into the furnace K and terminates above the mold. The spout preferably delivers the molten brass into a distributing trough N positioned in the furnace K above the mold and having numerous perforations distributed along the bottom; the result being that the molten metal falls upon the bottom of the pan in the mold in the manner of rain. The molten brass unites with the copper of the pan or shell and, when it has solidified, forms with the latter a solid block 5 of brass (see Figs. 6 and 7) faced with a thin sheet of copper constituting a die face.

The complementary die is made by casting upon the face of the die just described, after the latter has been covered with soot, a metal suited to the purpose. For many purposes so-called Samson metal, consisting mainly of zinc, copper, and aluminum, may be employed.

In Fig. 6 we have illustrated the manner in which a white metal complementary die may be made. The copper faced brass block, after the lava patch has been removed and the sides of the pan cut away, is set, face up, on a cast iron plate O, preferably about one-half inch thick and around it and spaced apart therefrom is placed an iron frame P, similar to the frame E previously described. Wet molding sand Q is packed in the space between the die block and the frame. A shallow perforated steel tray 6 is inverted upon the die block. The perforations in the tray should be large, say about three-eighths of an inch in diameter. Weights R, resting upon tall tripods S, hold the tray down. This assembly is heated in a furnace to about 1000 degrees F. and then, after removing it from the furnace, the molten Samson metal, also heated to about 1000 degrees F., is poured into the same to a depth of three-fourths of an inch or an inch; thus producing a block 7 of Samson metal having a die face complementary to that of the other block.

After the Samson metal has cooled, the two dies are separated and then clamped together and machined. The perforated steel near the face of the white metal die reenforces the block and keeps the adjacent metal from shrinking while cooling. The brass block needs no reenforcement, but the white metal block, after being machined, is preferably fitted into a cast iron tray, not shown.

Usually it is not desired that the dies fit accurately at all points because some parts of a panel should usually be compressed more than others. The dies may readily be relieved by cementing pieces of asbestos sheets to those areas on the face of the copper faced brass block where the lesser pressure is required when the dies are in use. When the metal is poured upon the copper faced block it cannot occupy the space already occupied by the asbestos, and the asbestos can afterwards be removed. In Fig. 7 we have shown such a piece of asbestos T on the copper face of the brass block; the asbestos being held in place by suitable cementing means as, for example, sodium silicate.

In Figs. 8 and 9 there is illustrated a modified way of producing the copper faced brass die block. Instead of using the outer frame E as a part of the mold, we provide a trough-shaped frame U of copper, L-shaped in cross-section, surrounding the pan and having its narrow side or flange riveted or otherwise fixed to the pan. The side walls of the pan and this frame, together with the base and the asbestos covering, produce a continuous closed chamber surrounding the pan. The frame G which, in this instance, is preferably made of copper is placed as previously described, and the asbestos and molding sand are interposed between this frame and the sides of the pan or shell, as before.

In Fig. 10 the copper shall $4^a$, instead of being pan-shaped, is simply a flat plate having the design in the center. This plate is set into a frame V, preferably of copper, the members of which are Z-shaped in cross-section. The copper shell rests upon the inturned flange of the frame and is riveted thereto. The frame G rests on the flat marginal portion of the shell. After the space within the frame G has been partially filled with a flux, as shown, the brass is poured in through the perforated tray, as heretofore described. The purpose of the perforated tray, as previously stated, is to distribute the incoming molten metal. If the metal were all poured at one point in a single heavy steam it would melt the copper more or less at this point. However, by distributing the molten metal over substantially the entire surface of the copper shell there will be no such concentration of heat at any single point as to injure the shell.

While we have illustrated and described with particularity a preferred series of steps and preferred metals, we do not wish to limit ourselves thereto; but intend to cover all processes and all metals or other materials coming within the definitions of our invention constituting the appended claims.

We claim:

1. The method of producing one of a pair of dies adapted to mold wood panels, which comprises the making of an electrodeposited shell with flaring sides and having the design in the under face of the bottom wall, setting the shell on a support, placing a frame, larger than the shell on the support, around the shell, setting a second frame within the shell, filling the spaces between the sides of the pan and the two frames with non-combustible material, and pouring molten metal into the pan in the space within the inner frame.

2. The method of producing a die member which consists of setting a die, face up, in a mold open at the top, placing the assembly in an oven, and heating the same, and pouring molten metal into the mold in the form of many small streams distributed across the length and breadth of the mold while the assembly remains in the oven.

3. The method of producing a die member which consists in forming a copper pan-like member having a bottom wall adapted to constitute the die face, placing in the pan-like member a continuous frame open at the top, and pouring molten brass into the space bounded by the frame.

4. The method of producing a die member which consists in forming a copper pan-like member having a bottom wall adapted to constitute the die face, placing in the pan-like member a continuous frame open at the top, raising the temperature of the pan-like member to about the temperature of molten brass, and pouring molten brass into the space bounded by the frame.

5. The method of producing a die member which consists in forming a copper pan-like member having a bottom wall adapted to constitute the die face, placing in the pan-like member a continuous frame open at the top, placing above the frame a trough having numerous perforations distributed over the bottom, heating the assembly to about the melting point of brass, and pouring molten brass into the trough.

In testimony whereof, we sign this specification.

FRANK M. CURRAN.
CHARLES B. NORRIS.
HENDRIK W. VAN STEENWYK.